United States Patent
Dani et al.

(10) Patent No.: US 11,049,010 B2
(45) Date of Patent: Jun. 29, 2021

(54) EARLY PREDICTION OF AN INTENTION OF A USER'S ACTIONS

(71) Applicant: UNIVERSITY OF CONNECTICUT, Farmington, CT (US)

(72) Inventors: Ashwin Dani, Manchester, CT (US); Harish Ravichandar, Willimantic, CT (US)

(73) Assignee: THE UNIVERSITY OF CONNECTICUT, Farmington, CT (US)

( * ) Notice: Subject to any disclaimer, the term of this patent is extended or adjusted under 35 U.S.C. 154(b) by 886 days.

(21) Appl. No.: 15/659,827

(22) Filed: Jul. 26, 2017

(65) Prior Publication Data
US 2018/0032868 A1    Feb. 1, 2018

Related U.S. Application Data

(60) Provisional application No. 62/366,663, filed on Jul. 26, 2016.

(51) Int. Cl.
*G06N 3/08* (2006.01)
*G06K 9/00* (2006.01)
(Continued)

(52) U.S. Cl.
CPC .............. *G06N 3/08* (2013.01); *B25J 9/0003* (2013.01); *B25J 9/161* (2013.01); *B25J 9/1664* (2013.01);
(Continued)

(58) Field of Classification Search
CPC ........ B25J 9/0003; B25J 9/161; B25J 9/1664; B25J 9/1697; G05B 2219/40202; G05B 2219/40408; G06K 2209/40; G06K 9/00355; G06K 9/627; G06N 3/08; G06T 2200/04; G06T 2207/10016; G06T 2207/10028; G06T 2207/20076;
(Continued)

(56) References Cited

U.S. PATENT DOCUMENTS

| 2015/0127149 | A1  | 5/2015  | Sinyavskiy et al. |
| 2015/0217449 | A1  | 8/2015  | Meier et al. |
| 2017/0334066 | A1* | 11/2017 | Levine .............. B25J 9/161 |

OTHER PUBLICATIONS

Ng et al. ("Using the EM Algorithm to Train Neural Networks: Misconceptions and a New Algorithm for Multiclass Classification", IEEE Transactions on Neural Networks, vol. 15, No. 3, May 2004, pp. 738-749) (Year: 2004).*
(Continued)

*Primary Examiner* — Kakali Chaki
*Assistant Examiner* — Robert Lewis Kulp
(74) *Attorney, Agent, or Firm* — Cantor Colburn LLP (57) ABSTRACT

A computer-implemented method includes recording, with a three-dimensional camera, one or more demonstrations of a user performing one or more reaching tasks. Training data is computed to describe the one or more demonstrations. One or more weights of a neural network are learned based on the training data, where the neural network is configured to estimate a goal location of the one or more reaching tasks. A partial trajectory of a new reaching task is recorded. An estimated goal location is computed, by a computer processor, by applying the neural network to the partial trajectory of the new reaching task.

12 Claims, 5 Drawing Sheets

(51) Int. Cl.
  *B25J 9/16* (2006.01)
  *G06T 7/285* (2017.01)
  *G06K 9/62* (2006.01)
  *B25J 9/00* (2006.01)
  *G06T 7/277* (2017.01)

(52) U.S. Cl.
  CPC ........ *B25J 9/1697* (2013.01); *G06K 9/00355* (2013.01); *G06K 9/627* (2013.01); *G06T 7/277* (2017.01); *G06T 7/285* (2017.01); *G05B 2219/40202* (2013.01); *G05B 2219/40408* (2013.01); *G06K 2209/40* (2013.01); *G06T 2200/04* (2013.01); *G06T 2207/10016* (2013.01); *G06T 2207/10028* (2013.01); *G06T 2207/20076* (2013.01); *G06T 2207/20081* (2013.01); *G06T 2207/20084* (2013.01)

(58) Field of Classification Search
  CPC ... G06T 2207/20081; G06T 2207/2008; G06T 7/277; G06T 7/285
  See application file for complete search history.

(56) References Cited

OTHER PUBLICATIONS

Li et al. ("Human-Robot Collaboration Based on Motion Intention Estimation", IEEE/ASME Transactions on Mechatronics, vol. 19, No. 3, Jun. 2014, pp. 1007-1014) (Year: 2014).*

Perez-D'Arpino et al. ("Fast Target Prediction of Human Reaching Motion for Cooperative Human-Robot Manipulation Tasks using Time Series Classification", 2015 IEEE International Conference on Robotics and Automation (ICRA), Seattle, May 26-30, 2015, pp. 6175-6182) (Year: 2015).*

De Momi et al. ("A Neural Network-Based Approach for Trajectory Planning in Robot-Human Handover Tasks", Front. Robot. AI 3: 34, Jun. 27, 2016, pp. 1-10) (Year: 2016).*

C. Morato, K. N. Kaipa, B. Zhao, and S. K. Gupta, "Toward safe human robot collaboration by using multiple kinects based realtime human tracking," ASME Journal of Computing and Information Science.

D. Song, N. Kyriazis, I. Oikonomidis, C. Papazov, a. Argyros, D. Burschka, and D. Kragic, "Predicting human intention in visual observations of hand/object interactions," in 2013 IEEE International Conference on Robotics and Automation. IEEE, 2013, pp. 1608-1615.

H. S. Koppula and A. Saxena, "Anticipating human activities using object affordances for reactive robotic response." in Robotics: Science and Systems, 2013.

H. S. Koppula, R. Gupta, and A. Saxena, "Learning human activities and object affordances from rgb-d videos," The International Journal of Robotics Research, vol. 32, No. 8, pp. 951-970, 2013.

International Preliminary Report on Patentability; Application No. PCT/US2017/043886; dated Feb. 7, 2019; 7 Sages.

International Search Report and Written Opinion; Application No. PCT/US17/43886; dated Oct. 6, 2017; 17 pages.

R. Luo and D. Berenson, "A framework for unsupervised online human reaching motion recognition and early prediction," in International Conference on Intelligent Robots and Systems (IROS), 2015, pp. 2426-2433.

Ravichandar, H et al. 'Human Intention Inference and Motion Modeling using Approximate E-M with Online Learning'. In: 2015 IEEE/RSJ International Conference on Intelligent Robots and Systems (IROS), Congress Center Hamburg, Sep. 28-Oct. 2, 2015. Hamburg, Germany, 10.1109/IROS.2015.7353614; pp. 1819, 1822, 1823.

Z. Wang, K. Mulling, M. P. Deisenroth, H. B. Amor, D. Vogt, B. Scholkopf, and J. Peters, "Probabilistic movement modeling for intention inference in human-robot interaction," The International Journal of Robotics Research, vol. 32, No. 7, pp. 841-858, 2013.

* cited by examiner

EARLY PREDICTION OF AN INTENTION OF A USER'S ACTIONS

CROSS-REFERENCE TO RELATED APPLICATIONS

The present application claims priority to U.S. Provisional Application No. 62/366,663, filed on Jul. 26, 2016, the contents of which are incorporated by reference herein in their entirety.

BACKGROUND

Embodiments of the present invention relate to robotics and, more specifically, to early prediction of an intention of a user's actions.

Human intention inference is a natural step in achieving safety in human-robot collaboration. With intention inference, the robot can have knowledge of how the user will likely move. As a result, the robot can plan its own movements accordingly, so as not to collide with the user and so as not to perform redundant actions. Studies in psychology show that when two humans interact with each other, each one infers the intended actions of the other and decides based on this inference what proactive actions could be taken for safe interaction and collaboration. Thus, to enable robots to work more effectively with humans, improved human intention inference can be helpful.

SUMMARY

According to an embodiment of this disclosure, a computer-implemented method includes recording, with a three-dimensional camera, one or more demonstrations of a user performing one or more reaching tasks. Training data is computed to describe the one or more demonstrations. One or more weights of a neural network are learned based on the training data, where the neural network is configured to estimate a goal location of the one or more reaching tasks. A partial trajectory of a new reaching task is recorded. An estimated goal location is computed, by a computer processor, by applying the neural network to the partial trajectory of the new reaching task.

In another embodiment, a system includes a memory having computer readable instructions and one or more processors for executing the computer readable instructions. The computer readable instructions include recording, with a three-dimensional camera, one or more demonstrations of a user performing one or more reaching tasks. Further according to the computer readable instructions, training data is computed to describe the one or more demonstrations. One or more weights of a neural network are learned based on the training data, where the neural network is configured to estimate a goal location of the one or more reaching tasks. A partial trajectory of a new reaching task is recorded. An estimated goal location is computed, by applying the neural network to the partial trajectory of the new reaching task.

In yet another embodiment, a computer program product for inferring an intention includes a computer readable storage medium having program instructions embodied therewith. The program instructions are executable by a processor to cause the processor to perform a method. The method includes recording, with a three-dimensional camera, one or more demonstrations of a user performing one or more reaching tasks. Further according to the method, training data is computed to describe the one or more demonstrations. One or more weights of a neural network are learned based on the training data, where the neural network is configured to estimate a goal location of the one or more reaching tasks. A partial trajectory of a new reaching task is recorded. An estimated goal location is computed, by applying the neural network to the partial trajectory of the new reaching task.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Embodiments of a learning system described herein infer the intention of a user's movements, such as arm movements, based on observations from a three-dimensional (3D) camera. In some embodiments, the intention that is inferred is a goal, or future, location of an arm reaching task in 3D space.

In some embodiments, the learning system models nonlinear motion dynamics of a user's arm using a nonlinear function, with intentions represented as parameters. A model for the motion may be learned through use of a neural network (NN). This model may be a state-space model, where the NN may be used to represent state propagation. Joint positions and velocities of a human skeletal structure of the user may be used as states, while intentions may be parameters of the state-space model.

Based on the learned model, an approximate expectation-maximization (E-M) algorithm may be developed to infer human intentions. More specifically, by using a NN, intention inference may be solved as a parameter inference problem using an approximate expectation-maximization (EM) algorithm. The intention inference problem may handle three sources of uncertainty: uncertain system dynamics, sensor measurement noise, and unknown human intent. Further, in some embodiments, an identifier-based online model learning algorithm may adapt to variations in the motion dynamics, motion trajectory, goal locations, and initial conditions of varying human users.

Figure 1:
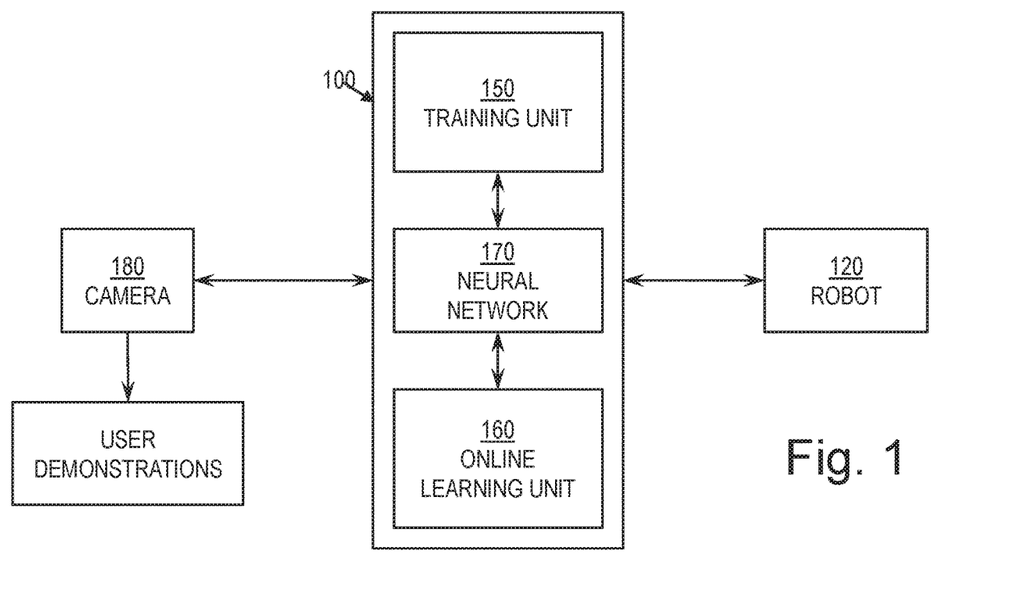
FIG. 1 is a block diagram of a learning system, according one or more embodiments of this disclosure.

FIG. 1 is a block diagram of a learning system 100, according to one or more embodiments of this disclosure. The learning system 100 may determine an intention (i.e., an intended goal location) of a user, which may be a human user, performing a reaching task in a 3D workspace shared with a robot 120. Based on the intention, the learning system 100 may instruct the robot 120 on how to interact with the user.

The learning system 100 may include a training unit 150 and an online learning unit 160, both of which may be hardware, software, or a combination of hardware and software. Generally, the training unit 150 may train a neural network (NN) 170 based on training data derived from one or more user demonstrations of reaching tasks; and the online learning unit 160 may predict intentions for new reaching tasks and may also update the NN 170 based on test data derived from these new reaching tasks.

In some embodiments, the learning system 100 may be implemented on a computer system and may execute a training algorithm and an online learning algorithm, executed respectively by the training unit 150 and the online learning unit 160, as described below. Further, the learning system 100 may be in communication with a camera 180, such as Microsoft Kinect® for Windows® or some other camera capable of capturing data in three dimensions, which may record demonstrations of reaching tasks as well as new reaching tasks after initial training of the NN 170.

For the purpose of this disclosure, there may be a set of intentions $G=\{g_1, g_2, \ldots, g_3\}$, where each $g_i \in \mathbb{R}^3$ represents a goal location, which may be a location in 3D space of an object in the workspace. Each reaching task performed may be associated with an intention $g \in G$, which may be a location at which the reaching task culminates. For example, and not by way of limitation, G may represent a set of finite locations on a table. Although it is assumed throughout this disclosure that G includes a set of finite values, it will be understood that some embodiments may be extended to cover a continuous G.

In some embodiments, a state $x_t$ may represent the various positions and velocities of selected points on a user's arm. For instance, $x_t \in \mathbb{R}^{24}$ may represent the positions and velocities of four points on the arm, specifically the shoulder, elbow, wrist, and palm, where these points describe overall movement of the arm at a given time step t. The variable $z_t \in \mathbb{R}^{24}$ may represent measurements obtained from the camera 180 at the time step t, where $x_t$ may be derived based in part on $z_t$, as will be described further below. Evolution of the state $x_t$ over time may depend on both a previous value of the state (i.e., at a previous time step) as well as an estimated intention g.

Figure 2:
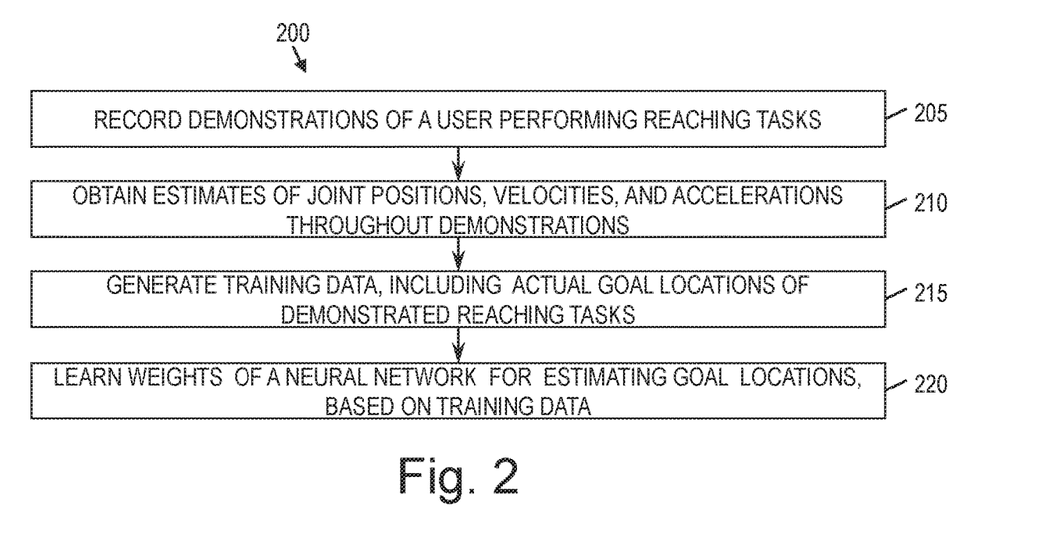
FIG. 2 is a flow diagram of a method for training a neural network of the learning system to infer intentions of reaching tasks, according to one or more embodiments of this disclosure.

FIG. 2 is a flow diagram of a method 200 for training the NN 170 to infer intentions of reaching tasks, according to some embodiments of this disclosure.

As shown, at block 205, the learning system 100 may record one or more demonstrations of a user performing reaching tasks. In some embodiments, each demonstration may include culmination of the reaching task at a corresponding goal location. Thus, each such demonstration may be associated with a corresponding goal location. As will be discussed further below, the NN 170 may be trained based on these demonstrations of reaching actions.

At block 210, the learning system 100 obtain estimates of joint positions, velocities, and accelerations for the one or more demonstrations. Specifically, in some embodiments, the joint positions, velocities, and accelerations may be estimated by applying a Kalman filter to the data recorded at block 205, as described further below. Together, these estimates and the goal locations may be used as training data for the NN 170.

In some embodiments, the joint positions may be recorded by the camera 180 in block 205, and may thus be obtained in the camera's frame of reference. Where $p^c=(x^c, y^c, z^c)^T$ is a point in the camera's reference frame, and $p^r=(x^r, y^r, z^r)^T$ is a point in the robot's reference frame, the points $p^c$ and $p^r$ are related by $p^c=R_r^c p^r+T_r^c$ (hereinafter "Formula 1"). In Formula 1, $R_r^c \in SO(3)$ and $T_r^c \in \mathbb{R}^3$ are, respectively, a rotation matrix and a translation vector.

The camera 180 may measure 3D positions of the user's joints, which may be used as raw positions. These raw positions may be input into a Kalman filter to obtain the velocity and acceleration estimates of the joints.

In some embodiments, a measurement model may be represented in the generic form $y_t=h(x_t)+v_t$, where measurement function $h(x_t)=H_{x_t}+b$; $b=[[T_r^c]^T, [T_r^c]^T, [T_r^c]^T, [T_r^c]^T, 0_{1\times 12}]^T$; $H=\text{diag}\{R_r^c, R_r^c, \ldots, R_r^c\} \in \mathbb{R}^{24\times 24}$ is a block diagonal matrix; and $\{v_t\}\sim N(0, \Sigma_z) \in \mathbb{R}^{24}$ is a zero-mean Gaussian noise with a covariance matrix $\Sigma \in \mathbb{R}^{24\times 24}$. The measurement noise $\{v_t\}$ may be assumed to be independent of the process noise $\{\omega_t\}$ defined in Formula 2, provided below. Further, the measurement model of the shifted measurement vector $z_t=y_t-b$ at time t may be given by $z_t=Hx_t+v_t$.

At block 215, the learning system 100 may generate training data based on the joint positions, velocities, and accelerations. For instance, in the training data, the joint positions, velocities, and accelerations for each reaching task may be associated with the corresponding goal location of that reaching task.

At block 220, the learning system may learn the NN 170, based on the one or more demonstrations, specifically, based on the training data derived from the demonstrations. More specifically, learning the NN 170 may include learning the weights of the NN 170, as described in detail below.

In some embodiments, a state transition model describes evolution of the state of the robot 120 over time. The state transition model may be described by the equation $\dot{x}=f_c^*(x_t, g)+\omega_t$ (hereinafter "Formula 2"). In this equation, $\{\omega_t\}\sim N(0, Q_c) \in \mathbb{R}^{24}$ is a non-zero Gaussian random process with a covariance matrix $Q_c \in \mathbb{R}^{24\times 24}$; and $f_c^*(x_t, g): \mathbb{R}^{24}\times\mathbb{R}^3 \to \mathbb{R}^{24}$ is assumed to be an analytical function.

The nonlinear function $f_c^*(x_t, g)$, of Formula 2, may be modeled using the NN 170 given by $f_c^*(x_t, g)=W^T\sigma(U^T s_t)+\in(s_t)$, where $s_t=[[x_t^T, g^T], 1]^T) \in \mathbb{R}^{28}$ is a vector input to the NN 170;

$$\sigma(U^T s_t) = \left[\frac{1}{1+\exp((-U^T s_t)_1)}, \frac{1}{1+\exp((-U^T s_t)_2)}, \ldots, \frac{1}{1+\exp((-U^T s_t)_i)}, \ldots, \frac{1}{1+\exp((-U^T s_t)_{n_h})}\right]^T$$

is a vector-sigmoid activation function; and $(U^T s_t)_i$ is the $i^{th}$ element of the vector $(U^T s_t)$; $U \in \mathbb{R}^{28\times n_h}$ $W \in \mathbb{R}^{n_h\times 24}$ are bounded constant weight matrices; $\in(s_t) \in \mathbb{R}^{24}$ is a function reconstruction error that goes to zero after the NN 170 is fully trained; and $n_h \in \mathbb{Z}^+$ is the number of neurons in a hidden layer of the NN 170.

The learning system 100 may train the NN using Bayesian regularization, a robust algorithm suitable for applications where training data is noisy and the sample size is small, as may be the case in some embodiments. In some embodiments, the NN 170 may be trained using Bayesian regularization with the objective function $J(U, W)=K_\alpha E_D+K_\beta E_W$, where $E_D=\Sigma_i(y_i-a_i)^2$ is a sum of squared errors; $y_i$ is the target location; $a_i$ is the NN's output; $E_W$ is a sum of the squares of weights of the NN 170; and $\alpha$ and $\beta$ are parameters of regularization that can be used, respectively to change emphasis between reducing reconstruction errors and reducing weight sizes.

Figure 3:
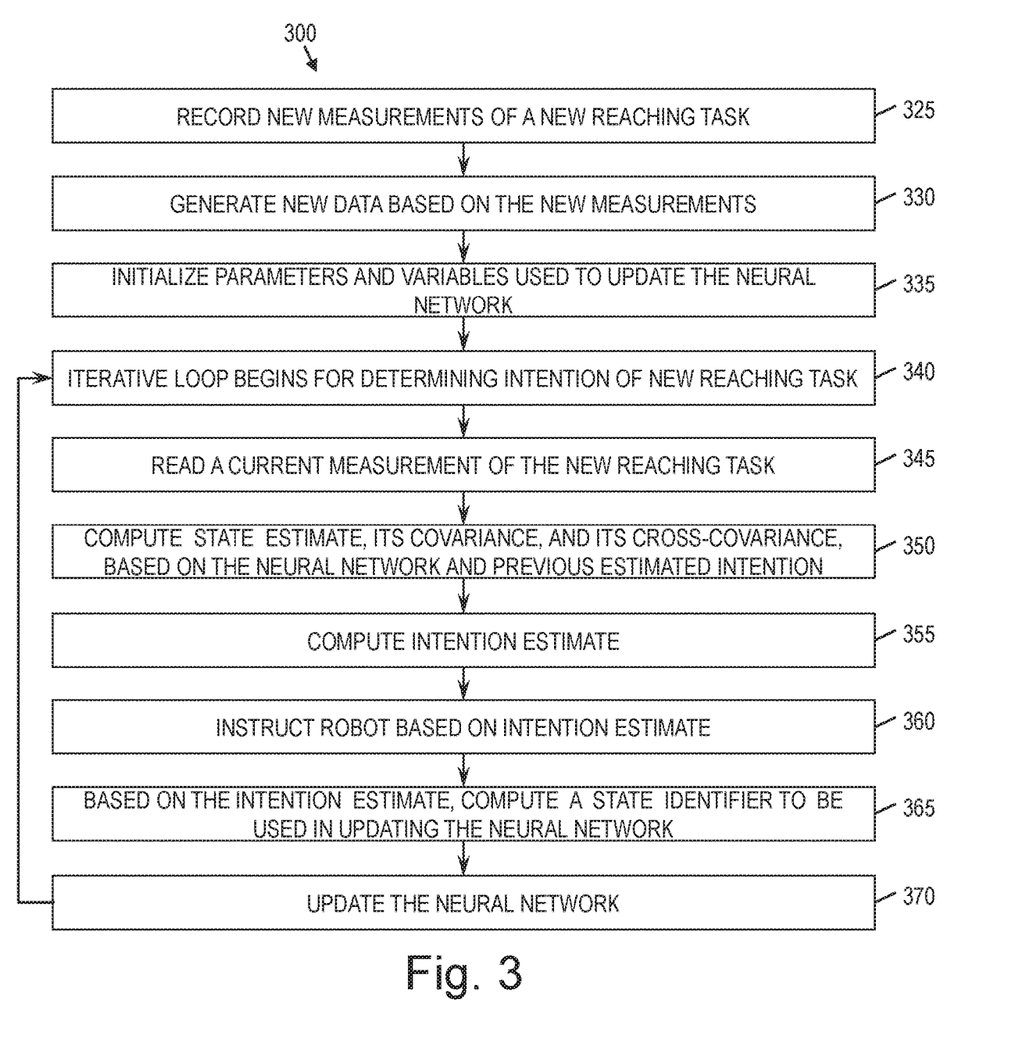
FIG. 3 is a flow diagram of a method for inferring intentions of reaching tasks, with online updating, according to one or more embodiments of this disclosure.

FIG. 3 is a flow diagram of a method 300 for inferring intentions of reaching tasks, with online updating, according to some embodiments of this disclosure. In some embodiments, the method 300 of FIG. 3 may occur after initial training of the NN 170 according to the method 200 of FIG. 2.

At block 325, the learning system 100 may record new measurements of a new reaching task being performed by a user. The user may or may not be a user who demonstrated reaching tasks incorporated into the training data. The new reaching task may be unfinished and may thus form only a partial trajectory toward the user's intended goal location. In some embodiments, these new measurements may be recorded by the camera 180.

At block 330, the learning system 100 may generate new data from the recorded measurements, and that new data may include estimates of joint positions, velocities, and accelerations of the new reaching task. Again, the generation of this data may be performed through application of a Kalman filter, this time with respect to the new measurements. However, unlike the training data, this new data may exclude actual goal locations. This new data may be used as the value of $Z_T$ in the formulas presented below, where $Z_T$ refers to a set of measurements from an initial time instance to a current time t.

At block 335, the learning system 100 may initialize various parameters and variables to be used in updating the NN 170 and in estimating an intention (i.e., an intended goal location) of the new reaching task. For example, and not by way of limitation, this may include initializing $\hat{x}_0$, $\hat{P}_0$, $\hat{x}_{id_0}$, and $\hat{g}_0$; defining the parameters $\mu_0$, $P_0$, $Q$, and $\Sigma_z$; and defining the gains for the online update algorithm k, $\alpha$, $\gamma$, $\beta_1$, $\Gamma_W$, $\Gamma_{U_s}$, and $\Gamma_{U_g}$. These variables and parameters will be described further below.

At block 340, an iterative loop begins for determining the intention g of the new reaching task.

The learning system 100 may iteratively infer an intention g of the new reaching task, as the new measurements become available. In other words, the intention may be generated repeatedly, thus becoming more refined. In some embodiments, the EM algorithm requires the state transition model to be in discrete form. As such, the state transition model defined in Formula 2 may be discretized using first-order Euler approximation, yielding $x_t=f(x_{t-1}, g)+\omega_t T_s$ (hereinafter "Formula 3"), where $f(x_{t-1}, g)=x_{t-1}+W^t{}_{\sigma(U^T S_{t-1})}T_s$ and $T_s$ is the sampling period.

To infer intention, the learning system 100 may aim to maximize the posterior probability of $Z_T$, the new data, given the intention g, using a maximum-likelihood (ML) criterion, where $Z_T=z_{1:T}$ is a set of observations from time t=1 to t=T, and where T can differ between the training data and the new data. In other words, $Z_T$ refers to a set of measurements from an initial time instance to the time T, while each $z_t$ refers to an isolated measurement at time t. Process noise of the discretized system in Formula 3 may be given by $Q=T_s^2 Q_c$. The log-likelihood function of the intention g, $l(g)$, may be $l(g)=\log p(Z_T|g)$ (hereinafter "Formula 4"), which can be obtained by marginalizing the joint distribution $l(g)=\log\int p(X_T, Z_T|g)dX_T$ (hereinafter "Formula 5"). In Formula 5, $X_T=x_{1:T}$ may be a collective representation of states from time t=1 to t=T.

In some embodiments, the learning system 100 may use an approximate EM algorithm with modifications for handling state transition models trained using the NN 170. Using the fact that $E_{X_T}\{\log [p(Z_T|g)]|X_T\hat{g}_t\}=\log p(Z_T|g)$, the log-likelihood defined in Formula 4 may be decomposed as $\log p(Z_T|g)=E_{X_T}\{\log [p(Z_T,X_T|g)]|Z_T\hat{g}_t\}-E_{X_T}\{\log [p(X_T|Z_T,g)]|Z_T\hat{g}_t\}$ $\log p(Z_T|g)=Q(g,\hat{g}_t)-H(g,\hat{g}_t)$ (hereinafter "Formula 6" and "Formula 7," respectively).

In the above Formulas 6 and 7, where $E_{X_T}$ is the expectation operator; $\hat{g}_t$ is an estimate of the intention g at time t; $Q(g, \hat{g}_t)=E_{X_T}\{\log [p(Z_T, X_T|g)]|Z_T\hat{g}_t\}$ is an expected value of the complete data log-likelihood given the various measurements and intentions of the training data; and $H(g, \hat{g}_t)=E_{X_T}\{\log [p(X_T|Z_T, g)]|Z_T\hat{g}_t\}$. It can be shown using Jensen's inequality that $H(g, \hat{g}_t)\leq H(\hat{g}_t, \hat{g}_t)$. Thus, to iteratively increase the log-likelihood, it may be required to choose g such that $Q(g, \hat{g}_t)\geq Q(\hat{g}_t, \hat{g}_t)$.

As described in more detail below, the learning system 100 may compute the auxiliary function $Q(g, \hat{g}_t)$ given the observations $Z_T$ and a current estimate of the intention $\hat{g}_t$. The learning system 100 may also compute the next intention estimate $\hat{g}_{t+1}$, after the current intention estimate, by finding a value of g that maximizes $Q(g, \hat{g}_t)$.

At block 345, the learning system 100 may read a current measurement $z_t$ of the new reaching task.

At block 350, based on the current NN 170 and the previous intention estimate $\hat{g}_{t-1}$, the learning system 100 may compute $\hat{x}_t$, $\hat{P}_t$, and $\hat{P}_{t,t-1}$, respectively a state estimate, the covariance of the state estimate, and the cross covariance of the state estimates at times t and t−1. This computation may be performed by using an extended Kalman function (EKF). This may be performed by computing the auxiliary function $Q(g, \hat{g}_t)$ given the observations $Z_T$ and a current estimate of the intention $\hat{g}_t$.

To this end, the learning system 100 may evaluate the expectation of the complete data log-likelihood given by $Q(g, \hat{g}_t)=E_{X_T}\{\log [p(Z_T, X_T|g)]|Z_T\hat{g}_t\}=E_{X_T}\{V_0+\Sigma_{t=1}^T V_t(x_t, X_{t-1}, g)|Z_T, \hat{g}_t\}$ (hereinafter "Formula 8"). If $\{v_t\}$ and $\{\omega_t\}$ are Gaussian, $V_0$ and $V_t(x_t, x_{t-1}, g)$ may be given by $V_0=\log [p(x_0|g)]=\log [p(x_0)]=\text{const}-\frac{1}{2} \log [|P_0|]-\frac{1}{2}(x_0-\mu_0)^T P_0^{-1}(x_0-\mu_0)$ and $V_t(x_t, x_{t-1}, g)=\log [p(z_t|x_t)]+\log [p(x_t|x_{t-1}, g)]$ (hereinafter collectively "Formula 9"), where $\mu_0$ and $P_0$ are respectively the initial state mean and covariance; $|\cdot|$ is the determinant operator; $\log [p(z_t|x_t)]=-\frac{1}{2} \log [|\Sigma_z|]-\frac{1}{2}\{(z_t-h(x_t))^T\Sigma_z^{-1}(z_t-h(x_t))\}$ and $\log [p(x_t|x_{t-1}, g)]=-\frac{1}{2} \log [|Q|]-\frac{1}{2}\{(x_t-f(x_{t-1}, g))^T Q^{-1}(x_t-f(x_{t-1}, g))\}$ (hereinafter "Formula 10").

In Formula 9, $\log [p(z_t|x_t, g)]$ is replaced by $\log [p(z_t|x_t)]$. This is because, for the intention inference problem, the measurement $z_t$ need not depend on the intention g. When attempting to optimize Formula 9, a difficulty arises due to the nonlinearity of the state transition model. Thus, in some embodiments, the nonlinear state transition model may be represented by the NN. In order to compute the expectation of the log-likelihood in Formula 10, the expression inside the curly brackets of Formula 10 may be linearized about $\bar{x}_t$ and $\bar{x}_{t-1}$ using the Taylor series expansion. In practice, the points of linearization $\{\bar{x}_t\}$ may be obtained from the measurements of the joints by ignoring measurement noise and inverting h( ), the measurement function, which may be a simple affine transformation invertible to obtain the points of linearization from the measurements.

Where $\nabla_t = (x_t - f(x_{t-1}, g))^T Q^{-1}(x_t - f(x_{t-1}, g))$, the Taylor series expansion of $\nabla_t$ may be $$\overline{\nabla}_t \approx \overline{\nabla}_t(\overline{x}_t, \overline{x}_{t-1}) + \frac{\partial \overline{\nabla}_t(\overline{x}_t, \overline{x}_{t-1}, g)}{\partial x_t}[x_t - \overline{x}_t] +$$

$$\frac{\partial \overline{\nabla}_t(\overline{x}_t, \overline{x}_{t-1}, g)}{\partial x_{t-1}}[x_{t-1} - \overline{x}_{t-1}] + \frac{1}{2}[x_t - \overline{x}_t]^T \frac{\partial^2 \overline{\nabla}_t(\overline{x}_t, \overline{x}_{t-1}, g)}{\partial x_t \partial x_t}[x_t - \overline{x}_t] +$$

$$\frac{1}{2}[x_{t-1} - \overline{x}_{t-1}]^T \frac{\partial^2 \overline{\nabla}_t(\overline{x}_t, \overline{x}_{t-1}, g)}{\partial x_{t-1} \partial x_{t-1}}[x_{t-1} - \overline{x}_{t-1}] +$$

$$\frac{1}{2}[x_t - \overline{x}_t]^T \frac{\partial^2 \overline{\nabla}_t(\overline{x}_t, \overline{x}_{t-1}, g)}{\partial x_t \partial x_{t-1}}[x_{t-1} - \overline{x}_{t-1}] +$$

...(hereinafter "Formula 11").

The derivatives of $\nabla_t$ may be given by the following $$\frac{\partial \overline{\nabla}_t}{\partial x_t} = (Q^{-1} + Q^{-T})(x_t - f(x_{t-1}, g))$$

$$\frac{\partial \overline{\nabla}_t}{\partial (x_{t-1})_i} = \left[\frac{\partial \overline{\nabla}_t}{\partial f}\right]^T \frac{\partial f}{\partial (x_{t-1})_i}$$

$$\frac{\partial^2 \overline{\nabla}_t}{\partial x_t \partial x_t} = Q^{-1} + Q^{-T}$$

$$\frac{\partial^2 \overline{\nabla}_t}{\partial x_t \partial x_{t-1}} = -(Q^{-1} + Q^{-T})\left[\frac{\partial f}{\partial x_{t-1}}\right]$$

$$\frac{\partial^2 \overline{\nabla}_t}{\partial (x_{t-1})_i \partial (x_{t-1})_j} = \left[\frac{\partial^2 \overline{\nabla}_t}{\partial f (\partial x_{t-1})_i}\right]^T \frac{\partial f}{\partial (x_{t-1})_j} + \frac{\partial^2 f}{\partial (x_{t-1})_j \partial (x_{t-1})_i}\left[\frac{\partial \overline{\nabla}_t}{\partial f}\right]$$

(hereinafter "Formula 12," "Formula 13," "Formula 14," "Formula 15," and "Formula 16," respectively), where $$\left[\frac{\partial \overline{\nabla}_t}{\partial f}\right] = -[Q^{-1} + Q^{-T}][x_t - f(x_{t-1}, g)] \text{ and}$$

$$\left[\frac{\partial^2 \overline{\nabla}_t}{\partial f (\partial x_{t-1})_i}\right] = [Q^{-1} + Q^{-T}]^T \frac{\partial f}{\partial (x_{t-1})_i}.$$

It is noted that $$\frac{\partial f}{\partial x_{t-1}}$$

is the sub-matrix of the Jacobian of the NN that can be obtained by ignoring the matrix rows pertaining to $$\frac{\partial f}{\partial g}.$$

Thus, the Jacobian $$\frac{\partial f}{\partial x_t}$$

can be derived by taking the first n columns of $$\frac{\partial f}{\partial s},$$

where n is the number of states (i.e., the dimension of the state vector $x_t$). The Hessian $$\frac{\partial^2 f}{\partial (x_t) \partial (x_t)}$$

can be derived in a similar fashion.

Using Formulas 11 through 16, the expectation in Formula 8 can be written as $$Q(g, \hat{g}_t) =$$

$$-\frac{1}{2}\log[|P_0|] - \frac{1}{2}tr\{P_0(\hat{P}_0 + (\hat{x}_0 - \mu_0)(\hat{x}_0 - \mu_0)^T)\} - \frac{T}{2}\log\left[\left|\sum_z\right|\right] -$$

$$\frac{T}{2}\log[|Q|] - \frac{1}{2}\sum_{t=1}^{T} tr\left\{\sum_z^{-1}\left([z_t - H\hat{x}_t][z_t - H\hat{x}_t]^T + H\hat{P}_t H^T\right)\right\} -$$

$$\frac{1}{2}\sum_{t=1}^{T}\overline{\nabla}_t(\overline{x}_t, \overline{x}_{t-1}, g) - \frac{1}{2}\sum_{t=1}^{T}\left[\left[\frac{\partial \overline{\nabla}_t(\overline{x}_t, \overline{x}_{t-1}, g)}{\partial x_t}\right]^T[\hat{x}_t - \overline{x}_t]\right] -$$

$$\frac{1}{2}\sum_{t=1}^{T}\left[\left[\frac{\partial \overline{\nabla}_t(\overline{x}_t, \overline{x}_{t-1}, g)}{\partial x_{t-1}}\right]^T[\hat{x}_{t-1} - \overline{x}_{t-1}]\right] -$$

$$\frac{1}{4}tr\left\{\frac{\partial^2 \overline{\nabla}_t(\overline{x}_t, \overline{x}_{t-1}, g)}{\partial x_t \partial x_t}(\hat{P}_t + [\hat{x}_t - \overline{x}_t][\hat{x}_t - \overline{x}_t]^T)\right\} -$$

$$\frac{1}{4}tr\left\{\frac{\partial^2 \overline{\nabla}_t(\overline{x}_t, \overline{x}_{t-1}, g)}{\partial x_{t-1} \partial x_{t-1}}(\hat{P}_{t-1} + [\hat{x}_{t-1} - \overline{x}_{t-1}][\hat{x}_{t-1} - \overline{x}_{t-1}]^T)\right\} -$$

$$\frac{1}{4}tr\left\{\frac{\partial^2 \overline{\nabla}_t(\overline{x}_t, \overline{x}_{t-1}, g)}{\partial x_t \partial x_{t-1}}(\hat{P}_{t,t-1} + [\hat{x}_t - \overline{x}_t][\hat{x}_{t-1} - \overline{x}_{t-1}]^T)\right\} -$$

...(hereinafter "Formula 17").

In the above, $\hat{x}_t$ and $\hat{P}_t$ may be the state estimate and its covariance, respectively, while $\hat{x}_0$ and $\hat{P}_0$ may be their respective initial values; and $\hat{P}_{t,t-1}$ may be the cross covariance of the state estimates at times t and t-1. The state estimate $\hat{x}_t$ and the covariances $\hat{P}_t$ and $\hat{P}_{t,t-1}$ may be obtained using an EKF. To linearize the transition model for the EKF at a current time t, the learning system 100 may use the state estimate $\hat{x}_{t-1}$ from a previous time as a point of linearization. Formula 17 can be written in an iterative form to calculate the value of the Q function at every iteration. Thus, Formula 17 may be solved iteratively, with one iteration performed at each time step, such that an estimate of the goal location may be obtained at each time step.

At block 355, the learning system 100 may compute the intention estimate $\hat{g}_t$, such as by finding a value of g that maximizes $Q(g, \hat{g}_t)$. In some embodiments, the learning system 100 may optimize $Q(g, \hat{g}_t)$ over g as described by $\hat{g}_{t+1} = \arg\max_g Q(g, \hat{g}_t)$. This may be executed in various ways, such as by numerical optimization or direct evaluation as described below.

When using numerical evaluation of the Q function, $Q(g, \hat{g}_t)$, the learning system 100 may attempt to maximize the Q function through the use of a GradEM algorithm, where the first few iterations of the algorithm are used for this purpose.

This technique may include optimizing the Q function over $\mathbb{R}^3$. An update equation for $\hat{g}_t$, through GradEM algorithm, may be given by $\hat{g}_{k+1}=\hat{g}_k-\mathcal{H}(Q)^{-1}\Delta(Q)$ (hereinafter "Formula 18"), where $\hat{g}_k$ may be an estimate of g at the $k^{th}$ iteration of the optimization algorithm $\mathcal{H}(Q)$ and $\Delta(Q)$ are respectively the Hessian and Gradient of the Q function.

In some embodiments, numerical optimization may be performed at each time step of the EM algorithm, where each time step is a point in time at which the intention is reevaluated based on available new data for the new reaching task. Further, in some embodiments, the number of iterations for the optimization in Formula 18 may be chosen based on computational capabilities, and the Hessian of the Q function may be numerically approximated.

In contrast, when using direct evaluation of the Q function, the learning system 100 may infer g by evaluating the Q function for all possible $g_i$ (i.e., all possible goal locations) in G, so as to obtain $\hat{g}_{t+1}$ as described by $\hat{g}_{t+1} = \arg\max_{g \in G} Q(g, \hat{g}_t)$. This technique of evaluating the Q function may be executable if all possible goal locations $g_i$ are known a priori and are finite. This need not an unusual case in the context of the described problem scenario. For instance, the learning system 100 may use the camera 180 along with image processing algorithms to detect objects on the workbench, and to extract the 3D positions of those objects. The learning system 100 may then assume that each reaching task has a goal location equivalent to one of these 3D positions.

At block 360, instructions may be given to the robot 120, based in part on the estimated intention $\hat{g}_t$, so as to enable the robot 120 to interact with the user performing the new reaching task. It will be understood that the robot's activities in interacting with the user may vary widely, depending on the task being performed by the robot 120, the user, or both. Thus, these instructions may be of various types, designed to perform these activities effectively. For example, and not by way of limitation, it may be determined that the estimated intention is a location that is the same as a position of the particular object in the workspace. In that case, the instructions to the robot 120 may avoid collision with a trajectory of the user's arm moving toward that particular object.

At block 365, using the intention estimate $\hat{g}_t$, computed at block 350, the learning system may compute a state identifier $\dot{\hat{x}}_{idt}$, which may be used in updating the NN 170.

In some embodiments, the learning system 100 may continue to update the NN 170 in real time, while predictions of goal locations are being made, by way of an online learning algorithm. The online learning algorithm may be used to update the weights of the NN 170. In some embodiments, this online learning of the NN weights may make inferences of g robust to variations in starting arm positions and various motion trajectories taken by different people. In other words, the learning system 100 may continue to generate good results regardless of which user is performing a reaching task, and regardless of an initial arm position of that user.

Through application of the online learning algorithm, the NN weights may be updated iteratively as new data about the new reaching task becomes available. To this end, a state identifier may be used to compute an estimate of the state derivative based on current state estimates obtained from the EKF and the current NN weights. The learning system 100 may compute an error in the state identifier, based on the state estimate and measurement of the state. The error may be used to update the NN weights at the next time step. The state identifier may use a feedback term such as the robust integral of the sign of the error (RISE) to obtain asymptotic convergence of the state estimates and their derivatives to their true values.

Equations used to update the NN weights may use Lyapunov-based stability analysis. For instance, the state identifier is given by $\dot{\hat{x}}_{idt}=\hat{W}_t^T\sigma(\hat{U}_t^T\hat{s}_t)+\mu_t$ (hereinafter "Formula 19"), where $\hat{U}_t \in \mathbb{R}^{28 \times n_h}$; $\hat{W}_t \in \mathbb{R}^{n_h \times 24}$; $\hat{s}_t=[[\hat{x}_{idt}^T, \hat{g}_t], 1]^T \in \mathbb{R}^{28}$; $\hat{g}_t \in \mathbb{R}^3$ is the current estimate of g from the EM algorithm; $\hat{x}_{idt} \in \mathbb{R}^{24}$ is the current identifier state; and $\mu_t \in \mathbb{R}^{24}$ is the RISE feedback term defined as $\mu_t = k\tilde{x}_0 v_t$, where $\tilde{x}_t = \hat{x}_{idt}$ is the state identification error at time t; and $v_t \in \mathbb{R}^{24}$ is the Filippov generalized solution to the differential equation $\dot{v}_t = (k\alpha + \gamma)\tilde{x}_t + \beta_1 \text{sgn}(\tilde{x}_t)$, for $v_0 = 0$, where k, $\alpha$, $\gamma$, $\beta_1 \in \mathbb{R}^+$ are positive constant control gains; and sgn( ) denotes a vector signum function.

The learning system 100 may use weight update equations given by $\dot{\hat{W}}_t = \text{proj}(\hat{W}_t, \Gamma_w \hat{\sigma}' \hat{U}_{x_t}^T \dot{\hat{x}}_{idt} \tilde{x}_t^T)$; $\dot{\hat{U}}_{x_t} = \text{proj}(\hat{U}_{x_t}, \Gamma_{u_x} \dot{\hat{x}}_{idt} \tilde{x}_t^T \hat{W}_t^T \hat{\sigma}')$; and $\dot{\hat{U}}_{g_t} = \text{proj}(\hat{U}_{g_t}, \Gamma_{u_g} \hat{g}_t \tilde{x}_t^T \hat{W}_t^T \hat{\sigma}')$ (hereinafter collectively "Formula 20"), where $\hat{U}_{x_t}$ and $\hat{U}_{g_t}$ are submatrices of $\hat{U}_t$ formed by taking the rows corresponding to $\hat{x}_{idt}$ and $\hat{g}_t$ respectively; $\hat{\sigma}'$ is the first-order derivative of the sigmoid function with respect to its inputs; and $\Gamma_w$, $\Gamma_{u_x}$, and $\Gamma_{u_g}$ are constant weighting matrices of appropriate dimensions;

$$\text{proj}(\hat{\theta}, \phi) = \begin{cases} \phi \begin{cases} \text{if } \underline{\theta} \leq \hat{\theta} \leq \overline{\theta} \text{ or} \\ \hat{\theta} > \overline{\theta} \text{ and } \phi(t) \leq 0 \text{ or} \\ \hat{\theta} < \underline{\theta} \text{ and } \phi(t) \geq 0 \end{cases} \\ \overline{\phi} \text{ if } \hat{\theta} > \overline{\theta} \text{ and } \phi(t) > 0 \\ \underline{\phi} \text{ if } \hat{\theta} < \underline{\theta} \text{ and } \phi(t) < 0 \end{cases}$$

is a projection operator where $$\overline{\phi} \triangleq \left[1 + \frac{\overline{\theta} - \hat{\theta}}{\delta}\right]\phi \text{ and } \underline{\phi} \triangleq \left[1 + \frac{\hat{\theta} - \underline{\theta}}{\delta}\right]\phi.$$

In some embodiments, the projection operator ensures that the estimate $\hat{\theta} \in \Omega_\delta$ $\forall t \geq 0$, where $\Omega_\delta = \{\hat{\theta} | \underline{\theta} - \delta \leq \hat{\theta} \leq \overline{\theta} + \delta\}$. For this online learning algorithm, the learning system 100 may use $\hat{g}_t$ from the EM algorithm. Thus, for the purpose of the online learning, the learning system 100 may assume that $\hat{g}_t$ is a known parameter. The variable $\dot{\hat{g}}_t$, the derivative of the intention estimate, may be computed using the finite difference method. It can be shown that, in some embodiments, the state identifier defined in Formula 19 along with the update equations defined in Formula 20 are asymptotically stable.

At block 370, the learning system 100 may update the NN 170 by changing the weights, such as according to Formula 20, which appears above. In some embodiments, the method 300 may then return to block 340 to begin calculation of a new estimated intention $\hat{g}_t$ at a new time step where the time step t is incremented. This iterative loop may continue as long as an estimated intention is desired for the new reaching task.

Figure 4:
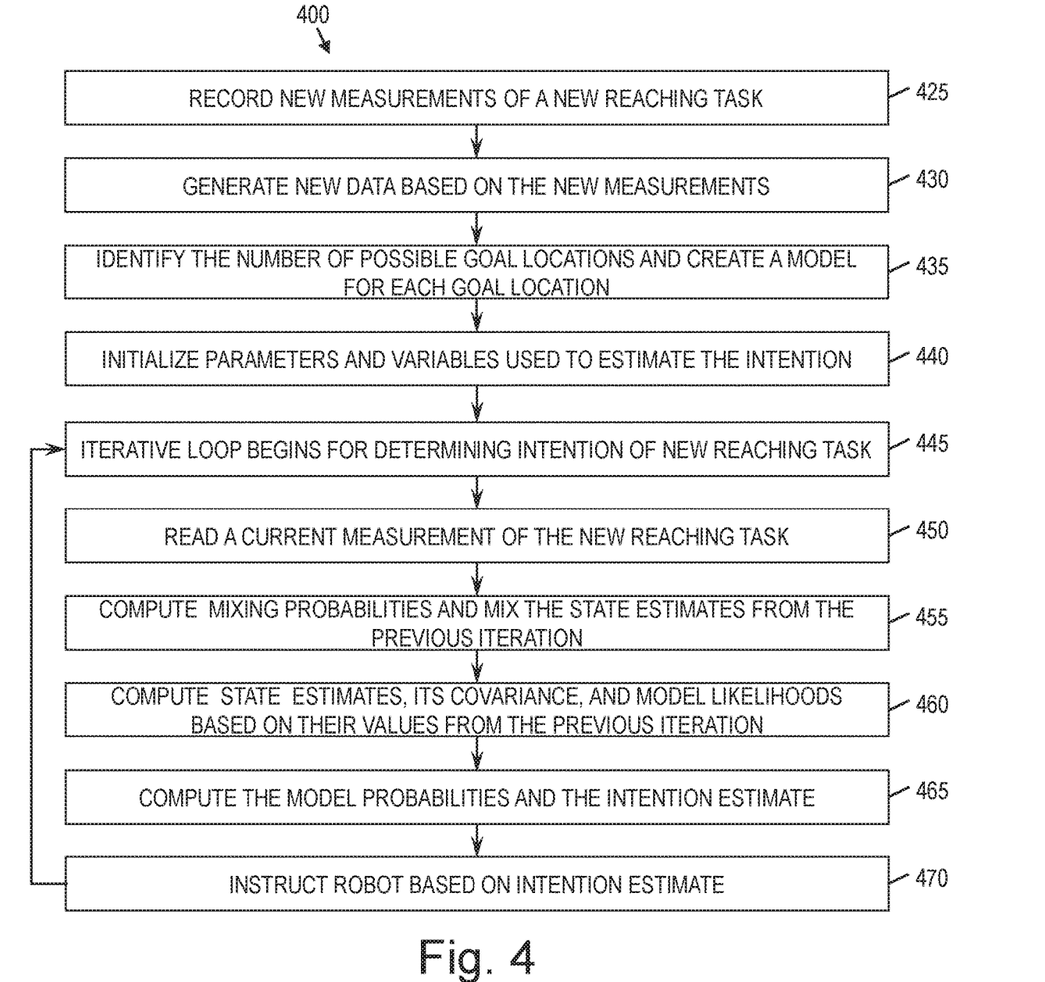
FIG. 4 is another flow diagram of a method for inferring intentions of reaching tasks, with online updating, according to one or more embodiments of this disclosure.

FIG. 4 is another flow diagram of a method 400 for inferring intentions of reaching tasks, with online updating, according to some embodiments of this disclosure. In some embodiments, the method 400 of FIG. 4 may occur after initial training of the NN 170 according to the method 200 of FIG. 2, and thus this method 400 may be used as an alternative to the method 300 of FIG. 3.

At block 425, the learning system 100 may record new measurements of a new reaching task being performed by a user. At block 430, the learning system 100 may generate new data from the recorded measurements, and that new data may include estimates of joint positions, velocities, and accelerations of the new reaching task. At block 435, the learning system 100 may identify the number of goal locations and create a model for each goal location. At block 440, the learning system 100 may initialize one or more parameters and variables used to estimate intentions. At block 445, an iterative loop may begin for determining an intention of a new reaching task. At block 450, the learning system 100 may read a current measurement of the new reaching task. At block 455, the learning system may compute one or more mixing probabilities and may mix state estimates from previous iterations of the loop or, if this is the first iteration, from default parameters. At block 460, the learning system 100 may compute state estimates and covariances of the state estimates, and may model likelihoods based on values of the state estimates and covariances from previous iterations or, if this is the first iteration, from default parameters. At block 465, the learning system 100 may compute model probabilities and an estimate for the intention.

At block 470, the learning system 100 may instruct the robot 120 based on the intention estimate. In some embodiments, the method 400 may then return to block 445 to begin calculation of a new estimated intention $\hat{g}_t$ at a new time step where the time step t is incremented. This iterative loop may continue as long as an estimated intention is desired for the new reaching task. Below follows a more detailed description of this method 400.

Given a state variable $x \in \mathbb{R}^n$, a set of D demonstrations $\{D_i\}_{i=1}^{D}$ are solutions to an underlying dynamics model governed by the following first-order differential equation $\dot{x}(t)=f(x(t))+w(t)$ (hereinafter "Formula 21"), where f: $\mathbb{R}^n \rightarrow \mathbb{R}^n$ is a nonlinear, continuous, and continuously differentiable function, and $w \sim \mathcal{N}(0, Q_c)$ is a zero-mean Gaussian process with covariance $Q_c$. Each demonstration may be associated with trajectories of a state $\{x(t)\}_{t=0}^{t=T}$ and trajectories of the state derivative $\{\dot{x}(t)\}_{t=0}^{t=T}$ from time t=0 to t=T. The nonlinear function f may be modeled using an artificial neural network (ANN), specifically $f(x(t))=W^T\sigma(U^Ts(t))+\in(s(t))$. In this ANN description, $s(t)=[x(t)^T, 1]^T \in \mathbb{R}^{n+1}$ is the input vector to the ANN;

$$\sigma(U^Ts(t)) = \left[\frac{1}{1+\exp(-(U^Ts(t))_1)}, \ldots, \frac{1}{1+\exp(-(U^Ts(t))_i)}, \ldots, \frac{1}{1+\exp(-(U^Ts(t))_{n_h})}\right]^T$$

is a vector-sigmoid activation function; $(U^Ts(t))_i$ is the $i^{th}$ element of the vector $(U^Ts(t))$; $U \in \mathbb{R}^{n+1 \times n_h}$ and $W \in \mathbb{R}^{n_h \times n}$ are bounded, constant-weight matrices; $\in(s(t)) \in \mathbb{R}^n$ is a function reconstruction error that goes to zero after the ANN is fully trained; and $n_h$ is the number of hidden layers of the ANN.

The learning system 100 may solve the following unconstrained optimization problem to train the ANN: $\{\hat{W}, \hat{U}\}$=arg min$_{W,U}\{\alpha E_D + \beta E_w\}$ (hereinafter "Formula 22"). In the above, $E_D = \Sigma_{i=1}^{D}[y_i-a_i]^T[y_i-a_i]$ is the sum of the squared error; $y_i \in \mathbb{R}^n$ and $a_i \in \mathbb{R}^n$ respectively represent the target and the network's output of the $i^{th}$ demonstration; $E_w$ is the sum of the squares of the ANN weights; $\alpha, \beta \in \mathbb{R}$ are scalar parameters of regularization.

Technical effects and benefits of one or more embodiments include the ability to model human arm motion dynamics using a NN 170 and to infer human intentions using a NN-based approximate EM algorithm. Technical effects and benefits may further include the ability to use online learning to adapt to various initial arm configurations and to various users.

Figure 5:
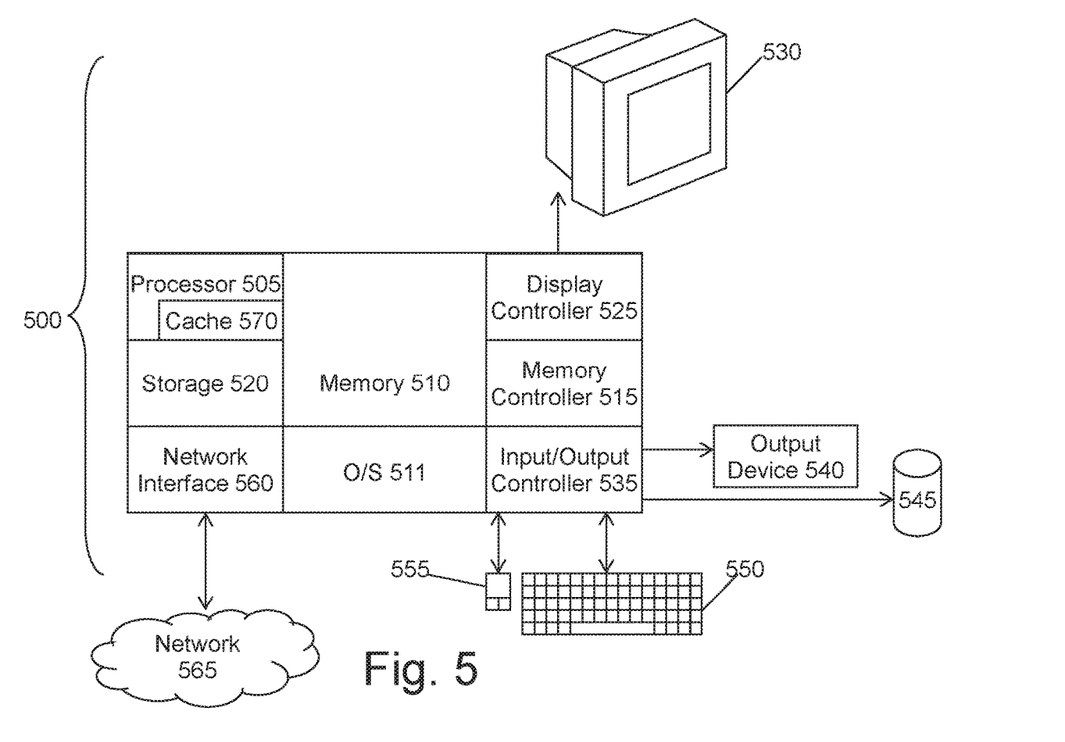
FIG. 5 is a block diagram of a computer system for implementing some or all aspects of the learning system, according to one or more embodiments of this disclosure.

FIG. 5 illustrates a block diagram of a computer system 500 for use in implementing a learning system 100 or method according to some embodiments. The learning systems 100 and methods described herein may be implemented in hardware, software (e.g., firmware), or a combination thereof. In some embodiments, the methods described may be implemented, at least in part, in hardware and may be part of the microprocessor of a special or general-purpose computer system 500, such as a personal computer, workstation, minicomputer, or mainframe computer.

In some embodiments, as shown in FIG. 5, the computer system 500 includes a processor 505, memory 510 coupled to a memory controller 515, and one or more input devices 545 and/or output devices 540, such as peripherals, that are communicatively coupled via a local I/O controller 535. These devices 540 and 545 may include, for example, a printer, a scanner, a microphone, and the like. Input devices such as a conventional keyboard 550 and mouse 555 may be coupled to the I/O controller 535. The I/O controller 535 may be, for example, one or more buses or other wired or wireless connections, as are known in the art. The I/O controller 535 may have additional elements, which are omitted for simplicity, such as controllers, buffers (caches), drivers, repeaters, and receivers, to enable communications.

The I/O devices 540, 545 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 505 is a hardware device for executing hardware instructions or software, particularly those stored in memory 510. The processor 505 may be a custom made or commercially available processor, a central processing unit (CPU), an auxiliary processor among several processors associated with the computer system 500, a semiconductor based microprocessor (in the form of a microchip or chip set), a microprocessor, or other device for executing instructions. The processor 505 includes a cache 570, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 570 may be organized as a hierarchy of more cache levels (L1, L2, etc.).

The memory 510 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 510 may incorporate electronic, magnetic, optical, or other types of storage media. Note that the memory 510 may have a distributed architecture, where various components are situated remote from one another but may be accessed by the processor 505.

The instructions in memory 510 may include one or more separate programs, each of which comprises an ordered listing of executable instructions for implementing logical functions. In the example of FIG. 5, the instructions in the memory 510 include a suitable operating system (OS) 511. The operating system 511 essentially may control the execution of other computer programs and provides scheduling, input-output control, file and data management, memory management, and communication control and related services.

Additional data, including, for example, instructions for the processor 505 or other retrievable information, may be stored in storage 520, which may be a storage device such as a hard disk drive or solid-state drive. The stored instructions in memory 510 or in storage 520 may include those enabling the processor to execute one or more aspects of the learning systems 100 and methods of this disclosure.

The computer system 500 may further include a display controller 525 coupled to a display 530. In some embodiments, the computer system 500 may further include a network interface 560 for coupling to a network 565. The network 565 may be an IP-based network for communication between the computer system 500 and an external server, client and the like via a broadband connection. The network 565 transmits and receives data between the computer system 500 and external systems. In some embodiments, the network 565 may be a managed IP network administered by a service provider. The network 565 may be implemented in a wireless fashion, e.g., using wireless protocols and technologies, such as WiFi, WiMax, etc. The network 565 may also be a packet-switched network such as a local area network, wide area network, metropolitan area network, the Internet, or other similar type of network environment. The network 565 may be a fixed wireless network, a wireless local area network (LAN), a wireless wide area network (WAN) a personal area network (PAN), a virtual private network (VPN), intranet or other suitable network system and may include equipment for receiving and transmitting signals.

Learning systems 100 and methods according to this disclosure may be embodied, in whole or in part, in computer program products or in computer systems 500, such as that illustrated in FIG. 5.

What is claimed is:

1. A computer-implemented method of training a learning system to predict intentions of reaching tasks of an arm of a user, wherein the learning system controls a robot to avoid collisions and redundant actions with the person,     wherein the learning system including a training unit and an on-line learning unit, wherein the training unit trains a neural network (NN) based on training data derived from one or more user demonstrations of reaching tasks; and wherein the online learning unit predicts intentions for new reaching tasks and updates the NN in real time based on test data derived from the reaching tasks, and     the method comprising the learning system:

recording, with a camera of the learning system, one or more demonstrations of the user to capture data $z_t$ in three-dimensions, wherein each demonstration represents the user performing one or more reaching tasks via their arm, and wherein the captured data $z_t$ represents positions in three dimensions of arm joints of the user, including shoulder, elbow, wrist, and palm, to describe overall movement of the arm at a time step t, wherein the arm joint positions are recorded in a camera reference frame corresponding to a point in a reference frame of the robot;

deriving, from the measurements obtained from the captured data $z_t$ at the time step t, a state $x_t$, representing estimated positions, velocities and accelerations of the arm joints, wherein the state $x_t$ depends on both a previous value of the state, at a previous time step t, and an estimated reaching intention g for the arm joints of the user that define a new reaching task, and wherein the arm joint positions, velocities, and accelerations are estimated by applying a Kalman filter to the recorded data;

associating each of the one or more demonstrations with corresponding recorded goal locations defined by a culmination of the reaching task, and training the NN based on the one or more demonstrations;

computing training data describing the one or more demonstrations from the estimates of the joint positions and the recorded goal locations;

learning one or more weights of the neural network based on the computed training data, the neural network being configured to derive an estimated goal location of the one or more reaching tasks, wherein the one or more weights make inferences that estimate the reaching intention g based on starting arm positions and motion trajectories;

recording a partial trajectory of a new reaching task; and     computing, by a computer processor, the estimated goal location, defining the estimated reaching intention g, of the new reaching task by applying the neural network to the partial trajectory of the new reaching task;

wherein computing the estimated goal location comprises solving a parameter inference problem by way of an expectation-maximization (EM) algorithm, wherein the EM algorithm utilizes a nonlinear state transition model, representing a positional state of the robot over time, that is discretized using first-order Euler approximation, and     wherein the learning system computes an error in the state $x_t$, based on the state estimate and measurement of the state, and wherein the error is utilized to update the NN weights at a next time step.

2. The computer-implemented method of claim 1, further comprising executing an online learning algorithm to update the one or more weights of the neural network based at least in part on the estimated goal location of the new reaching task.

3. The computer-implemented method of claim 2, wherein the online learning algorithm is configured to adapt the neural network to varying initial positions of an arm performing one or more future reaching tasks.

4. The computer-implemented method of claim 1, wherein computing the estimated goal location comprises iteratively calculating the estimated goal location based on the neural network and a previous calculation of the estimated goal location.

5. The computer-implemented method of claim 1, further comprising identifying an object reached for in the new reaching task.

6. The computer-implemented method of claim 1, further comprising instructing a robot based on the estimated goal location.

7. A learning system configured for being trained to predict intentions of reaching tasks of an arm of a user, wherein the learning system controls a robot to avoid collisions and redundant actions with the person, wherein the learning system includes a training unit and an on-line learning unit, wherein the training unit trains a neural network (NN) based on training data derived from one or more user demonstrations of reaching tasks; and wherein the online learning unit predicts intentions for new reaching tasks and updates the NN in real time based on test data derived from the reaching tasks, and the system comprising:

a memory having computer readable instructions; and one or more processors for executing the computer readable instructions, the computer readable instructions comprising:

recording, with a camera of the learning system, one or more demonstrations of the user to capture data $z_t$ in three-dimensions, wherein each demonstration represents the user performing one or more reaching tasks via their arm, and wherein the captured data $z_t$ represents positions in three dimensions of arm joints of the user, including shoulder, elbow, wrist, and palm, to describe overall movement of the arm at a time step t, wherein the arm joint positions are recorded in a camera reference frame corresponding to a point in a reference frame of the robot;

deriving, from the measurements obtained from the captured data $z_t$ at the time step t, a state $x_t$, representing estimated positions, velocities and accelerations of the arm joints, wherein the state $x_t$ depends on both a previous value of the state, at a previous time step t, and an estimated reaching intention g for the arm joints of the user that define a new reaching task, and wherein the arm joint positions, velocities, and accelerations are estimated by applying a Kalman filter to the recorded data;

associating each of the one or more demonstrations with corresponding recorded goal locations defined by a culmination of the reaching task, and training the NN based on the one or more demonstrations;

computing training data describing the one or more demonstrations from the estimates of the joint positions and the recorded goal locations;

learning one or more weights of the neural network based on the computed training data, the neural network being configured to derive an estimated goal location of the one or more reaching tasks, wherein the one or more weights make inferences that estimate the reaching intention g based on starting arm positions and motion trajectories;

recording a partial trajectory of a new reaching task; and computing, by a computer processor, the estimated goal location, defining the estimated reaching intention g, of the new reaching task by applying the neural network to the partial trajectory of the new reaching task;

wherein computing the estimated goal location comprises solving a parameter inference problem by way of an expectation-maximization (EM) algorithm, wherein the EM algorithm utilizes a nonlinear state transition model, representing a positional state of the robot over time, that is discretized using first-order Euler approximation, and  wherein the learning system computes an error in the state $x_t$, based on the state estimate and measurement of the state, and wherein the error is utilized to update the NN weights at a next time step.

8. The system of claim 7, the computer readable instructions further comprising executing an online learning algorithm to update the one or more weights of the neural network based at least in part on the estimated goal location of the new reaching task.

9. The system of claim 8, wherein the online learning algorithm is configured to adapt the neural network to varying initial positions of an arm performing one or more future reaching tasks.

10. The system of claim 7, wherein computing the estimated goal location comprises iteratively calculating the estimated goal location based on the neural network and a previous calculation of the estimated goal location.

11. The system of claim 7, the computer readable instructions further comprising identifying an object reached for in the new reaching task.

12. The system of claim 7, the computer readable instructions further comprising instructing a robot based on the estimated goal location.

* * * * *